(12) United States Patent
Ruano Álvarez et al.

(10) Patent No.: US 11,485,244 B2
(45) Date of Patent: Nov. 1, 2022

(54) VOLTAGE AND PFC BASED OBC PRE-CHARGE SYSTEM

(71) Applicant: LEAR CORPORATION, Southfield, MI (US)

(72) Inventors: César Ruano Álvarez, Valls (ES); Adrià Marcos Pastor, Tarragona (ES); Josep Maria Bosque Moncusi, Montblanc (ES); Victor Saborido Rodríguez, Vila-Seca (ES)

(73) Assignee: Lear Corporation, Southfield, MI (US)

( * ) Notice: Subject to any disclaimer, the term of this patent is extended or adjusted under 35 U.S.C. 154(b) by 137 days.

(21) Appl. No.: 17/178,452

(22) Filed: Feb. 18, 2021

(65) Prior Publication Data

US 2021/0284035 A1    Sep. 16, 2021

Related U.S. Application Data

(60) Provisional application No. 62/990,087, filed on Mar. 16, 2020.

(51) Int. Cl.
*B60L 53/22* (2019.01)
*B60L 50/51* (2019.01)

(52) U.S. Cl.
CPC .............. *B60L 53/22* (2019.02); *B60L 50/51* (2019.02); *B60L 2210/14* (2013.01); *B60L 2210/30* (2013.01)

(58) Field of Classification Search
CPC ...... B60L 53/22; B60L 50/51; B60L 2210/14; B60L 2210/30; B60L 2270/147; B60L 50/60; Y02T 10/7072; Y02T 10/72; Y02T 10/70; Y02T 10/92; Y02T 90/14; H02M 5/257; H02M 1/4225; H02J 7/345; H02J 2207/20; H02J 2207/50
USPC .......................................................... 320/109
See application file for complete search history.

(56) References Cited

U.S. PATENT DOCUMENTS

| | | | |
|---|---|---|---|
| 9,219,406 B1 | 12/2015 | Alexander | |
| 9,884,560 B2 | 2/2018 | Jang et al. | |
| 10,124,680 B1 | 11/2018 | Bartolome et al. | |
| 10,351,004 B1 | 7/2019 | Pastor et al. | |
| 10,562,404 B1 * | 2/2020 | Khaligh | H02M 1/44 |
| 2022/0224225 A1 * | 7/2022 | Chen | H02M 1/32 |

FOREIGN PATENT DOCUMENTS

| | | |
|---|---|---|
| KR | 101693995 B1 | 1/2017 |
| WO | 2005/096484 A1 | 10/2005 |

* cited by examiner

*Primary Examiner* — Paul Dinh
(74) *Attorney, Agent, or Firm* — Brooks Kushman P.C.

(57) ABSTRACT

An on-board charger for an electric vehicle a silicon controlled rectifier circuit configured to receive an AC input voltage and output a first AC rectified voltage, a power factor correction circuit configured to receive the rectified AC voltage and output a DC voltage, a DC Link capacitor that receives DC voltage as a capacitor voltage; and a controller configured to operate in a first mode and a second mode depending on the DC voltage.

21 Claims, 9 Drawing Sheets

VOLTAGE AND PFC BASED OBC PRE-CHARGE SYSTEM

CROSS-REFERENCE TO RELATED APPLICATIONS

This application claims the benefit of U.S. provisional application Ser. No. 62/990,087 filed Mar. 16, 2020, the disclosure of which is hereby incorporated in its entirety by reference herein.

TECHNICAL FIELD

In at least one aspect, a method and device for pre-charging DC-link capacitor in an electric or hybrid electric vehicle is provided.

BACKGROUND

The topology used in some AC-DC converters, such as onboard chargers (OBCs) for electric or hybrid electric vehicle batteries, requires a large capacitor to act as an energy buffer to provide constant output power from AC. This capacitor is referred to as a DC-link or bulk capacitor.

During normal operation, the capacitor remains charged above the peak of AC voltage and is provided energy with the PFC converter. However, when the converter stops working for some time, long enough to discharge the DC link passively, its voltage will be far below the AC peak voltage. In that scenario, if the circuitry is activated normally, the current inrush from the AC grid to the DC link would damage the components, resulting in the converter not being able to operate due to the large voltage at the input and the large size of the discharged capacitor.

For this reason, a method is needed to make the DC link reach a voltage at least equal to AC input peak before the converter can work in normal operation. A commonly used method is to use a resistor in parallel with a relay from connected from AC to DC-link when pre-charge is needed, with resistor limiting the current inrush. To charge the bulk capacitor, the relay is open so the AC current is limited by the resistor. When the bulk is charged enough, the relay is closed and bypasses the resistor. This method has an added cost due to additional components and a larger printed circuit board being needed.

Accordingly, there is a need for improved OBC design with enhanced pre-charging features.

SUMMARY

In at least one aspect, an on-board charger for providing a voltage based pre-charge includes a silicon controlled rectifier circuit in electrical communication with an AC power source that provides an AC input voltage and a power factor correction circuit in electrical communication with the silicon controlled rectifier, and a DC-link capacitor in electrical communication with the power factor correction circuit. The power factor correction circuit has a DC-link capacitor voltage. A controller is configured to trigger the silicon controlled rectifier circuit when the AC input voltage is at position in a half-cycle of the AC input voltage having a slope pointing to 0 volts and when an instantaneous capacitor voltage is below a predetermined voltage threshold. Characteristically, the voltage threshold is incremented for a next half-cycle such that the DC-link capacitor voltage incrementally increases until eventually being loaded at a pre-defined DC-link working voltage or a voltage within a pre-defined amount of the pre-defined DC-Link working voltage.

In another aspect, the first part of pre-charge (i.e., the first mode) in which only the SCRs are used to pre-charge the capacitor, the threshold is defined according to the capacitor voltage and is adjusted to be some voltage margin above the capacitor voltage. Characteristically, the SCR is triggered when the rectifier AC voltage has a slope pointing to 0 and below the defined threshold voltage.

In another aspect, an on-board charger for an electric or hybrid electric vehicle is provided. The on-board charger includes a silicon controlled rectifier circuit configured to receive an AC input voltage and output a rectified AC voltage. The on-board charger also includes a power factor correction circuit configured to receive the rectified AC voltage and output a DC voltage. A DC-link capacitor receives DC voltage as a DC-link capacitor voltage. A controller is configured to operate in a first mode and a second mode depending on the DC voltage. In the first mode, while the DC voltage is below or equal to a pre-defined voltage value, the DC link capacitor is charged in voltage steps with a voltage threshold for triggering the silicon controlled rectifier circuit being compared with the DC voltage after each voltage step. Characteristically, charging continues while the voltage threshold is below the pre-defined voltage value. Therefore, during charging periods, the silicon controlled rectifier circuit is triggered with trigger pulses to enable energy flow such that the DC-Link capacitor charges as the voltage threshold increases after each voltage step. Finally, in the second mode, while the DC voltage is above the pre-defined voltage value, the power factor correction circuit operates to boost the capacitor voltage.

In still another aspect, a pre-charge OBC internal DC-link capacitor is charged at small voltage steps by triggering input rectifier thyristors up to a defined level. The pre-charge is completed by activation of the PFC stage in boost mode.

In yet another aspect, a voltage threshold is selected depending on the current voltage at the DC-link capacitor voltage compared with a descending voltage of rectified AC voltage. Respective thyristors in a full-bridge rectifier are triggered to enable charging. When DC-link capacitor voltage reaches a defined value (e.g., a pre-defined DC-link working voltage or a voltage within a pre-defined amount of the pre-defined DC-Link working voltage), the thyristors trigger at the same threshold and the PFC is activated in boost mode to complete the charging process.

Advantageously, the OBC set forth herein provides a smooth DC-link charging, minimizing current peaks and thus reducing EMI and increasing capacitor working life, without the need of a specific pre-charge stage (resistor and relay). Moreover, the OBC reduces the number of components and the total volume of the OBC while providing improved charging progression (better EMC) and flexibility, thereby allowing earlier activation of the PFC.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "electrical signal" refers to the electrical output from an electronic device or the electrical input to an electronic device. The electrical signal is characterized by voltage and/or current. The electrical signal can be a stationary signal or it can vary with respect to time.

The terms "DC signal" refer to electrical signals that have voltage value that are always over 0 volts.

The terms "AC signal" refer to electrical signals that have voltages varying between positive and negative voltages and crossing 0 volts The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

Abbreviations:

"ADC" means analog-to-digital converter.

"EMC" means electromagnetic compatibility.

"OBC" means on-board battery charger.

"PFC" means power factor correction circuit.

"PWM" means pulse width modulator.

"SCR" means silicon controlled rectifier.

Figure 1A:
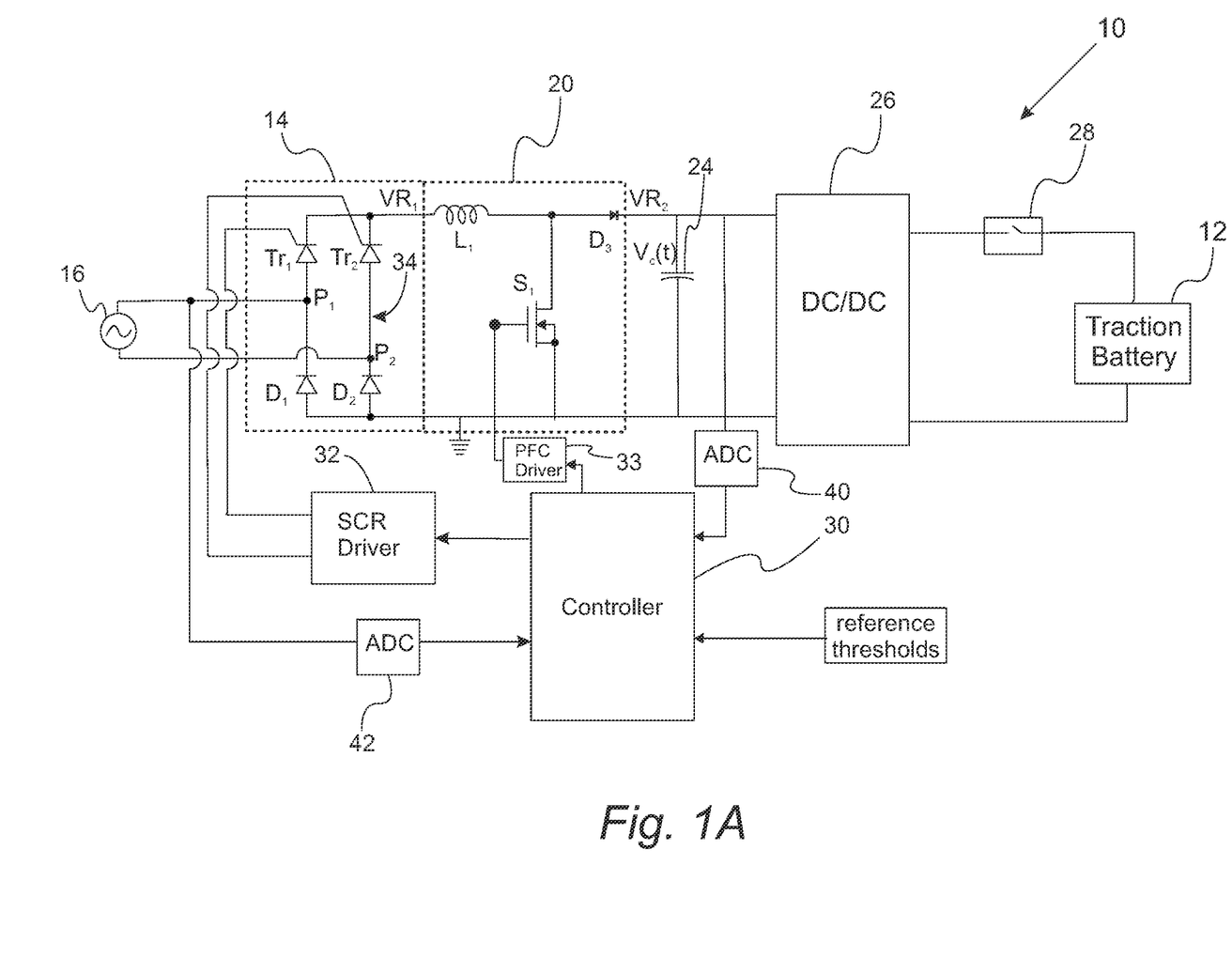
FIG. 1A. Schematic of an on-board charging system.

Referring now to FIG. 1A, a circuit and block diagram of an on-board charger is shown. OBC 10 is on-board an electric vehicle. OBC 10 is used for charging a traction battery 12 (or other loads) of the vehicle. OBC 10 includes SCR circuit 14 in electrical communication with an AC power source 16 that provides an AC input voltage. SCR circuit 14 outputs a rectified AC voltage $VR_1$. The AC input voltage is characterized by an AC voltage time period and a peak voltage value. PFC 20 is in electrical communication with the SCR circuit 14. PFC 20 receives rectified AC voltage $VR_1$ and outputs a DC voltage $VR_2$ (sometimes referred to as the DC-link voltage). In a refinement, PFC 20 includes a transistor switch $S_1$ configured to operate PFC 20, i.e., to turn it ON and OFF. The DC-link capacitor 24 receives an input current from the PFC circuit 20. Such electrical charge is stored and exhibited as Voltage by the capacitor.

Figure 1B:
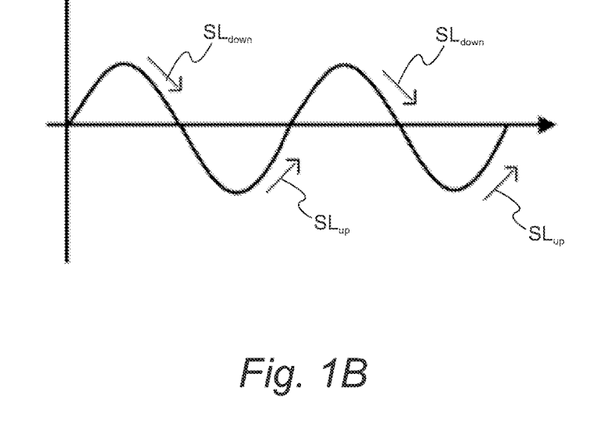
FIG. 1B. A plot of zero headed AC slopes
Figure 1C:
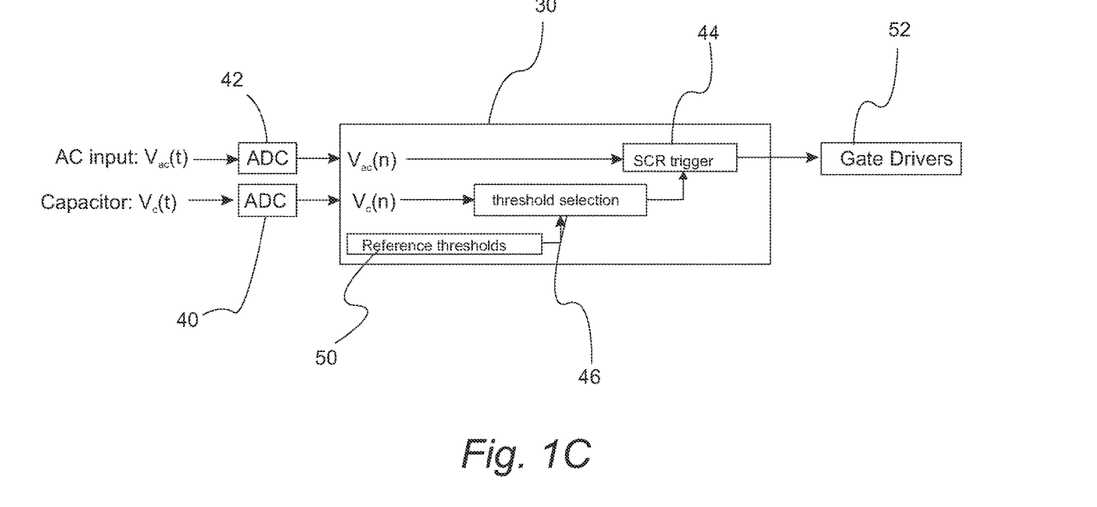
FIG. 1C. Schematic of the controller for the on-board charging system of FIG. 1.

Referring now to FIGS. 1A and 1B, controller 30 is configured to trigger SCR circuit 14 when the AC input voltage in a half-cycle of the AC input voltage has a slope pointing to 0 volts and when an instantaneous capacitor voltage is below a voltage threshold. For example, the first part of pre-charge (i.e., the first mode) in which only the SCRs are used to pre-charge the capacitor, the threshold is defined according to the capacitor voltage and is adjusted to be a predefined voltage margin above the capacitor voltage. Characteristically, the SCR is triggered when the rectifier AC voltage has a slope pointing to 0 and below the defined threshold voltage. For the second quarter of a positive voltage half-cycle, the slope is labeled as $SL_{down}$ and for the second quarter of the negative voltage half-cycle, the slope is labeled as $SL_{up}$. Alternatively expressed, SCR circuit 14 is triggered every AC half-cycle during descending quarters of the rectified AC voltage. The voltage threshold is incremented for a next half-cycle such that the DC-link capacitor voltage gradually increases until it is eventually loaded at a pre-defined charge voltage value, characteristically at 1/3 of AC input voltage peak. Sometimes herein, the predetermined charge voltage value is referred to as a pre-defined DC-link working voltage or a voltage within a pre-defined amount of the pre-defined DC-Link working voltage. In particular, controller 30 is configured to operate in a first mode and a second mode depending on the DC-link capacitor voltage as set forth below in more detail. Controller 30 is configured to control gate driver 32 which actuates SCR circuit 14 as well as switch 51 via PFC driver. In a refinement, PFC driver 33 can be inside controller block 30 with block 33 then being a gate driver for 51. Details of controller 30 are depicted in FIGS. 1C described below.

Still referring to FIG. 1A, DC/DC converter 26 receives capacitor voltage Vc(t) as an input to DC/DC converter 26. The output of DC/DC converter 26 is connected to the traction battery 12 through a disconnection element 28. The capacitor voltage is thus the DC voltage of the DC electrical power provided from SCR circuit 14 for charging traction battery 12.

Figure 2A:
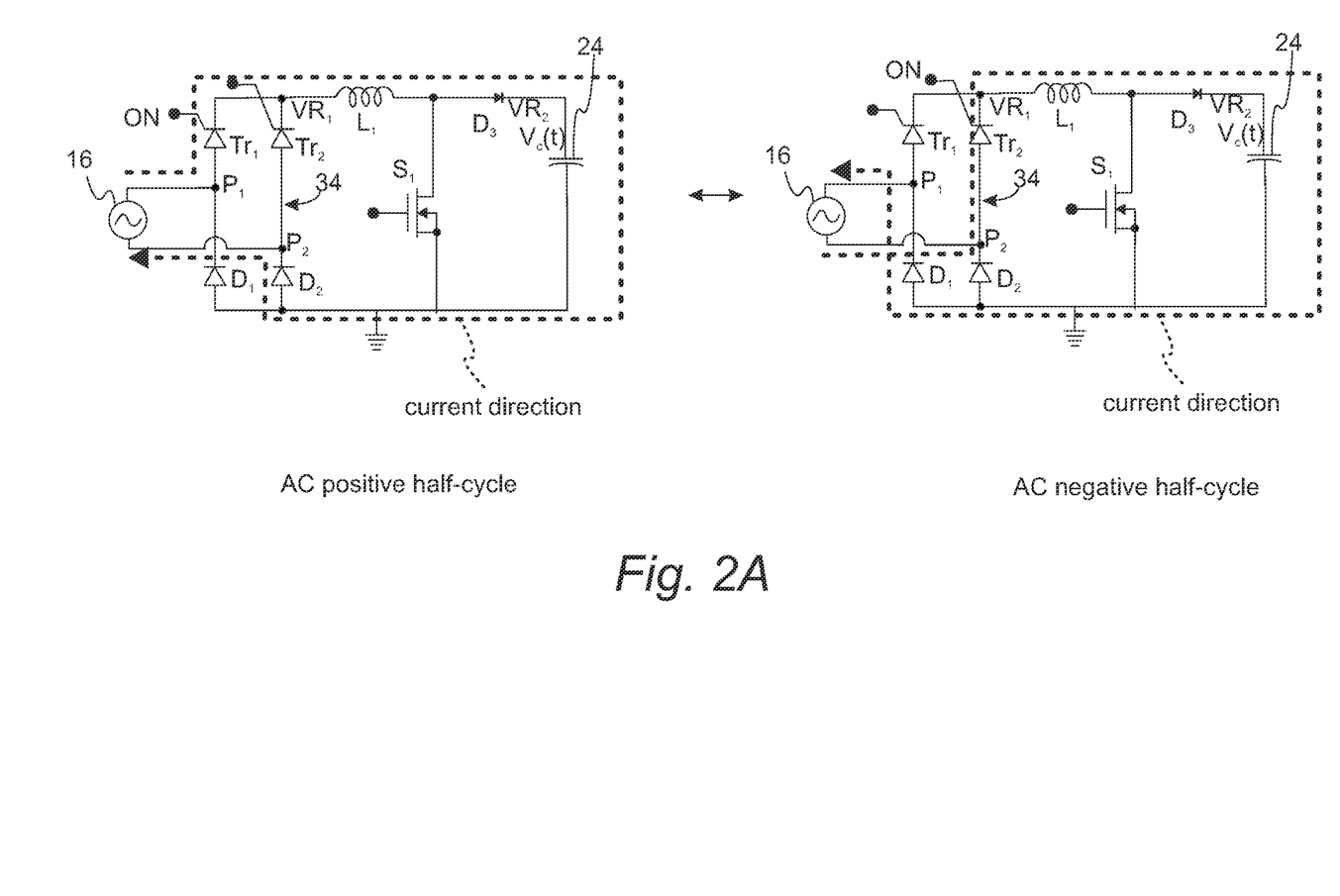
FIG. 2A. Schematic showing the operation of the SCR during a mode of operation where the capacitor voltage is below or equal to a predetermined voltage value.
Figure 2B:
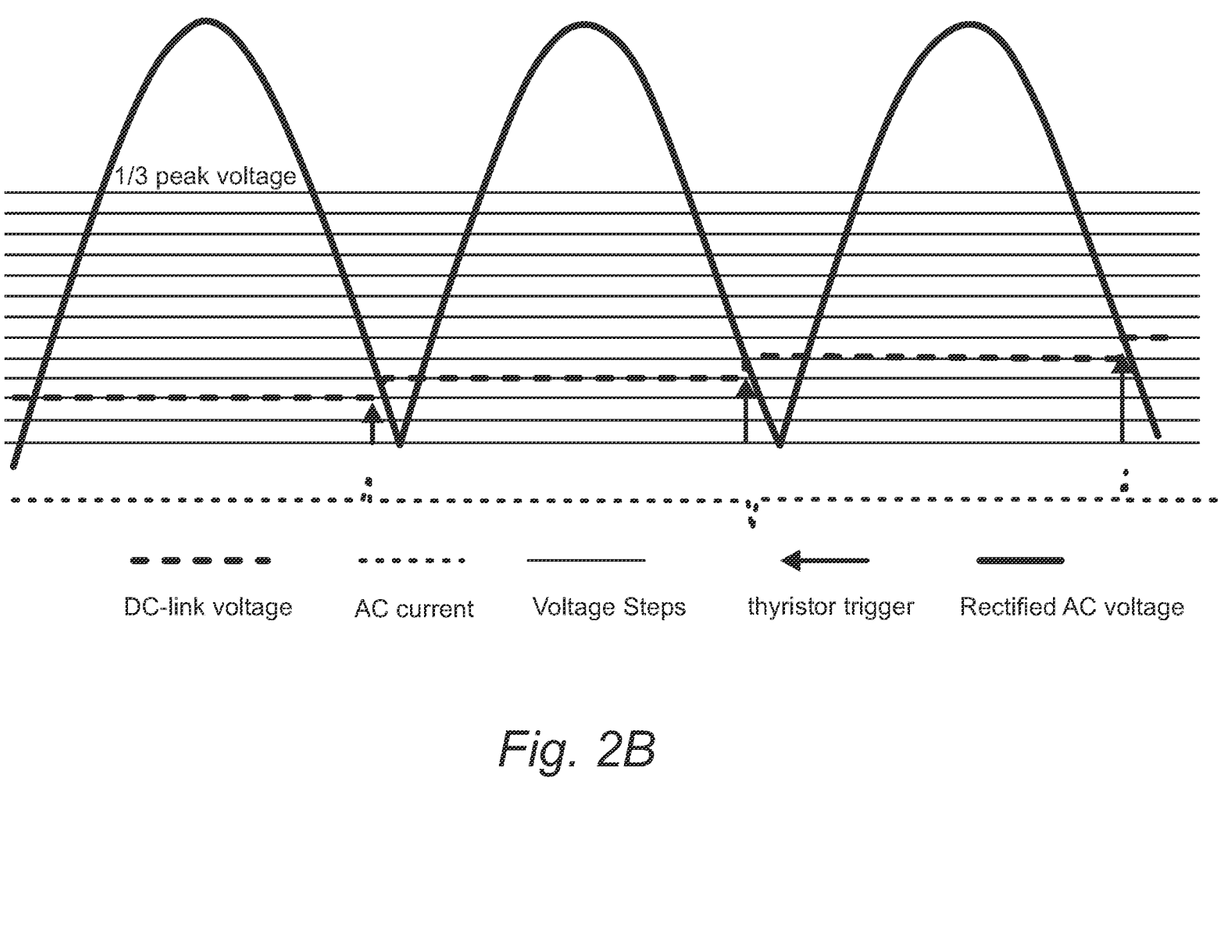
FIG. 2B. Plots of the voltages and AC current during operation depicted in FIG. 2A.

In a variation, SCR circuit 14 includes a full-wave rectifier 34 having a first thyristor $Tr_1$ in a first rectifier arm and a second thyristor $Tr_2$ in a second rectifier arm. Sometimes, a thyristor is referred to as silicon controlled rectifier. The full-wave rectifier 34 further includes a first diode $D_1$ in the first rectifier arm and a second diode $D_2$ in the second rectifier arm. AC input voltage is provided between a first contact position $P_1$ and a second contact position $P_2$. First contact position $P_1$ is between first thyristor $Tr_1$ and first diode $D_1$ while second contact position $P_2$ is between second thyristor $Tr_2$ and second diode $D_1$. During operation, full-wave rectifier 34 allows the same voltage polarity to be provided to the DC link capacitor 24 during the positive and negative portion of each input AC voltage cycle. FIGS. 2A and 2B illustrate the operation of SCR circuit 14. In this regard, it should be appreciated that thyristors are similar to diodes but can only drive current if the gate has been activated. Once the gate stimulus is removed, it can keep driving current until its polarity is reversed. In this regard, it should be appreciated that an SCR cannot drive current if its polarity is reversed, even with gate stimulus present. Full-wave rectifier 34 rectifies AC, so positive half-cycles are treated the same way as negative ones. A behavior that is key for the charging method is that if either first thyristor $Tr_1$ or second thyristor $Tr_2$ is triggered in a slope to 0, it will only drive while the AC (i.e., rectified AC voltage) is above the DC link voltage and then die out. In this way, the relevant thyristor will not drive in the next half-cycle, which would break the converter because it is in reverse polarity.

In a variation, PFC 20 includes inductor $L_1$ and diode $D_3$. $L_1$ connects full-wave rectifier 34 to diode $D_3$ while diode $D_3$ connects $L_1$ DC link capacitor 24. PFC 20 also includes transistor switch $S_1$ is positioned between the node connecting inductor $L_1$ and diode $D_3$ and the return path (or reference ground. Switch $S_1$ controls the energy transfer between $L_1$ and DC-Link capacitor 24. When transistor switch $S_1$ is closed, current flows from $L_1$ through transistor switch $S_1$ and L charges magnetically. When transistor switch $S_1$ is open, the energy accumulated in $L_1$ is transferred to DC-Link capacitor 24. Controller 30 controls the operation transistor switch $S_i$.

Referring to FIGS. 1A and 1C, controller 30 receives as inputs a first digital signal Vc(n) from ADC 40 and a second digital signal $V_{ac}(n)$ from ADC 42. ADC 40 receives as input the capacitor voltage Vc(t) while ADC 42 receives as input the AC input voltage $V_{ac}(t)$. Controller 30 includes SCR trigger component 44 and threshold component selection component 46. Threshold component 46 receives as inputs reference thresholds 50 and $V_c(n)$, which are compared. SCR trigger component 44 receives as inputs second digital signal $V_{ac}(n)$ and the output from threshold component 46. SCR trigger component 44 outputs a control signal to switch SCR drivers 52, which is used to turn thyristors in SCR 14 ON and OFF. In a refinement, SCR trigger component 44 and threshold component selection component 46 are implemented as digital blocks inside controller 30. The logic for these components can be based on a program in a memory, a series of internal blocks, programmable hardware, and the like. Another aspect of the charging method is instantaneous AC sampling. It is done by means of an internal dedicated ADC 42 in which samples are collected every 50 us, the same step at which the algorithm is executed.

Figure 1D:
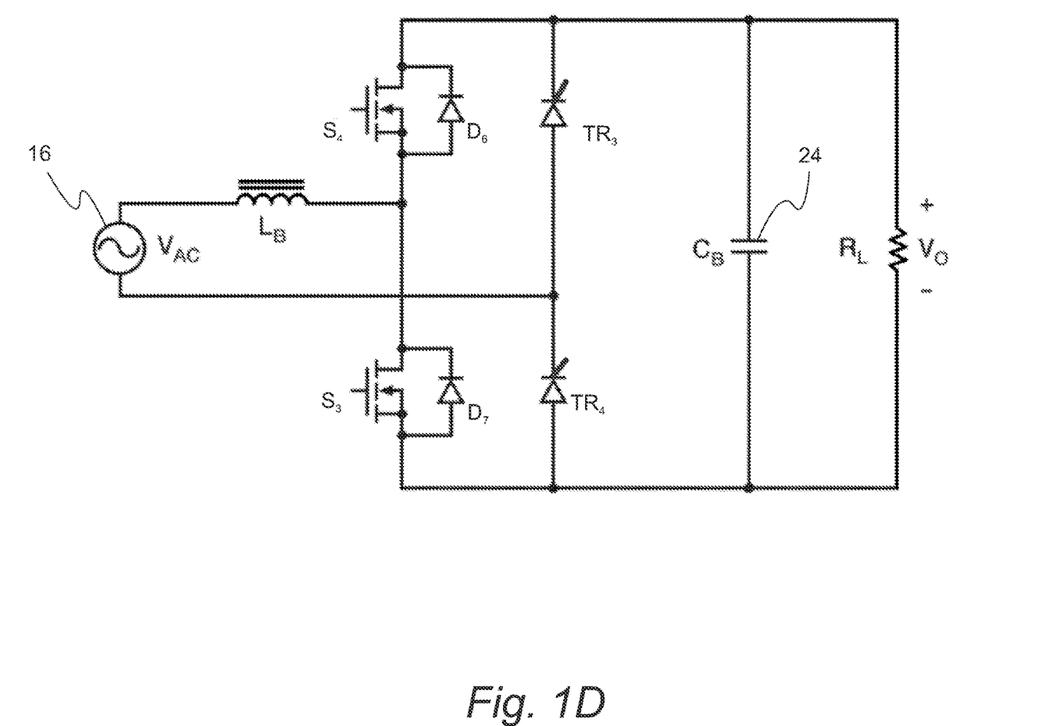
FIG. 1D. Schematic of a bridgeless topology having a Totem Pole PFC with Thyristors for the rectification.

In another variation, as depicted in FIG. 1D, a bridgeless topology is depicted. In this variation, the PFC is integrated with the AC rectifier as a Totem Pole PFC with Thyristors $Tr_1$, $TR_2$ for the rectification. OBC 10' also includes switches $S_3$, $S_4$.

Referring to FIGS. 2A, 2B, 3A, and 3B, controller 30 is configured to operate in a first mode and a second mode depending on the DC voltage of the DC-link capacitor. Controller 30 is configured to charge the DC-Link capacitor 24 in the first mode when in which the DC-link capacitor voltage Vc(t) is less than or equal to a predetermined voltage value that is a fraction of the AC peak voltage (e.g., 1/3 of the AC peak voltage). The SCR circuit 14 is actuated with a plurality of trigger pulses that charging occurs in voltage steps.

Referring to FIGS. 2A and 2B, operation in the first mode is illustrated. FIG. 2A shows the direction of the charging currents during charging in which PFC 20 provides the same voltage polarity to the DC link capacitor 24 during the positive and negative portion of each input AC voltage cycle. FIG. 2B shows the DC link voltage, the AC current flowing to DC-Link capacitor 24, the voltage steps (i.e., threshold voltages), the rectified AC voltage, and the thyristor triggers for this mode. At first, the AC grid frequency is measured by detecting local minimums that must be spaced at least 6 ms in time. The granularity of the measurement is thus the same as the periodic task looking for the minimum. This is done prior to loading the DC link voltage in order to characterize the network. The time between local minimums is computed and averaged over a predetermined number of consecutive cycles (e.g., in 4 consecutive cycles). These computations are continually updated. Once a frequency measurement has been done, the first mode operation, with the precise voltage-dependent thyristor triggering, can start. At first, the voltage threshold to trigger the thyristor is set to an initial voltage threshold. For example, an initial voltage threshold is the maximum of either the voltage already present in the DC link or to a preselected voltage threshold (e.g., 45V). The reason for setting this initial voltage threshold is to be able to trigger the thyristor at a time before the actual zero cross. Characteristically, the periodic task of the charging method executes every predetermined repetition period (e.g., 50 µs). As soon as an AC voltage sample is below the threshold, a pulse is applied to the SCR driver 32, and if the voltage at the input is above the voltage at the DC-link, it will allow current flow. Since only a small trigger pulse is applied, as soon as the voltage difference is zero, the SCR is reversed polarized and therefore returns to behave as an open circuit. In the next cycle, the threshold is increased, as can be seen in the figure, progressively increasing the DC-link voltage.

More particularly, when the DC voltage is below or equal to a pre-defined voltage value (e.g., 1/3 of AC input peak), the DC link capacitor 24 is charged in voltage steps with the voltage threshold for triggering the SCR circuit 14 increased after each voltage step until the voltage threshold reaches the predetermined voltage value (e.g., the voltage threshold is equal to or within one voltage step of the predetermined voltage value). The pre-defined voltage value provides the transition point for changing from the first mode to the second mode. The pre-defined voltage value can be from 0 to 2/3 of the AC input voltage peak. In a refinement, the pre-defined voltage value can be from 1/6 to 1/2 of the AC input voltage peak. In another refinement, the pre-defined voltage value is about 1/3 of the AC input voltage peak. It should be appreciated that in some situations the first mode can be bypassed with the system operated in the second mode from the beginning (e.g., when the pre-defined voltage value is 0 or slightly higher). When the DC-Link capacitor voltage reaches the pre-defined voltage value, the system starts working in the second mode to complete the pre-charge. In a variation, the predetermined voltage value is set to a value that is a fraction of the AC peak voltage (e.g., 1/3 of the AC peak voltage) or as low as a 0 volt threshold, which allows the PFC always active. SCR charging continues while the voltage threshold is below the pre-defined voltage value so that during charging periods, the SCR 12 is triggered with trigger pulses to enable energy flow such that the DC-Link capacitor 24 charges as the threshold voltage increases after each voltage step. In a refinement, the charging can be done every AC half-cycle (descending quarter). Moreover, depending on the processing speed of controller 30, each voltage step corresponds to 50 us. Characteristically, at second mode, when the PFC is working in Boost mode, DC-Link voltage may be higher than AC peak voltage, or lower, depending on the previous operation of the PFC or the SCRs and the remaining stored energy in the DC-link capacitor before having to run the pre-charge algorithm. In a refinement, the pre-charge may stop when the voltage at the DC-Link capacitor is within a predetermined amount (e.g., within 5%) of the DC-link voltage or AC-peak voltage. In another refinement, the pre-charge function is stopped when the DC-link voltage is slightly higher (1 to 20 V and more particularly, 5-10 V approximately) than the AC peak voltage. This is to ensure that no inrush of current will happen when stopping the pre-charge function. In the first mode, when the capacitor voltage reaches the pre-defined voltage, the SCR 14 triggering threshold remains the same for the next cycles. In this situation, the second mode is entered, and PFC 20 takes over for a faster and safer end of pre-charge.

Figure 3A:
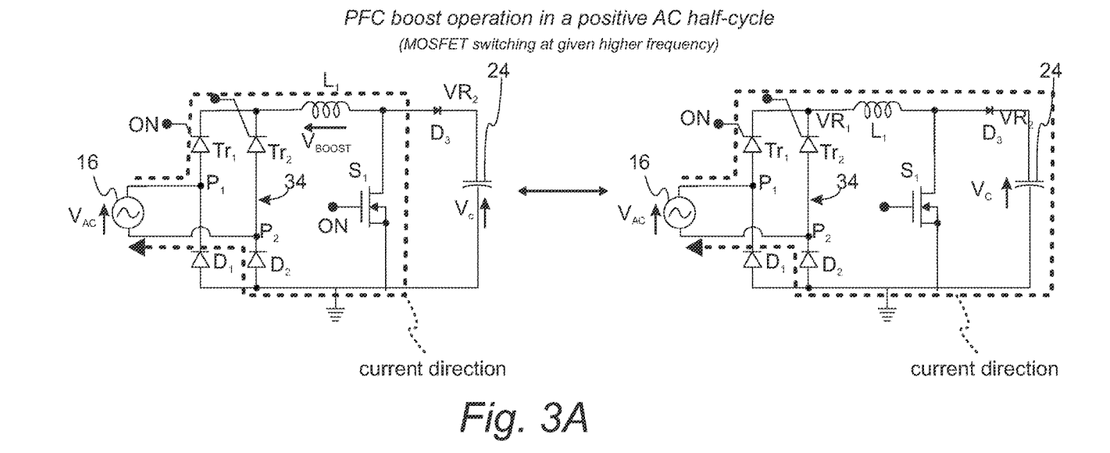
FIGS. 3A and 3B. Schematic showing the operation of the SCR and the PFC during a mode of operation where the capacitor voltage is above a predetermined voltage value.
Figure 3B:
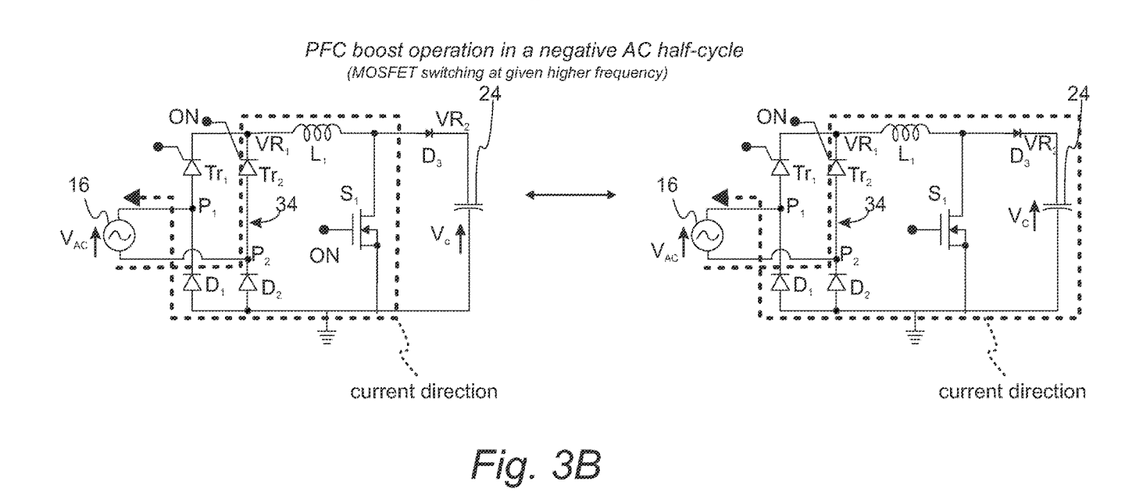
Figure 3C:
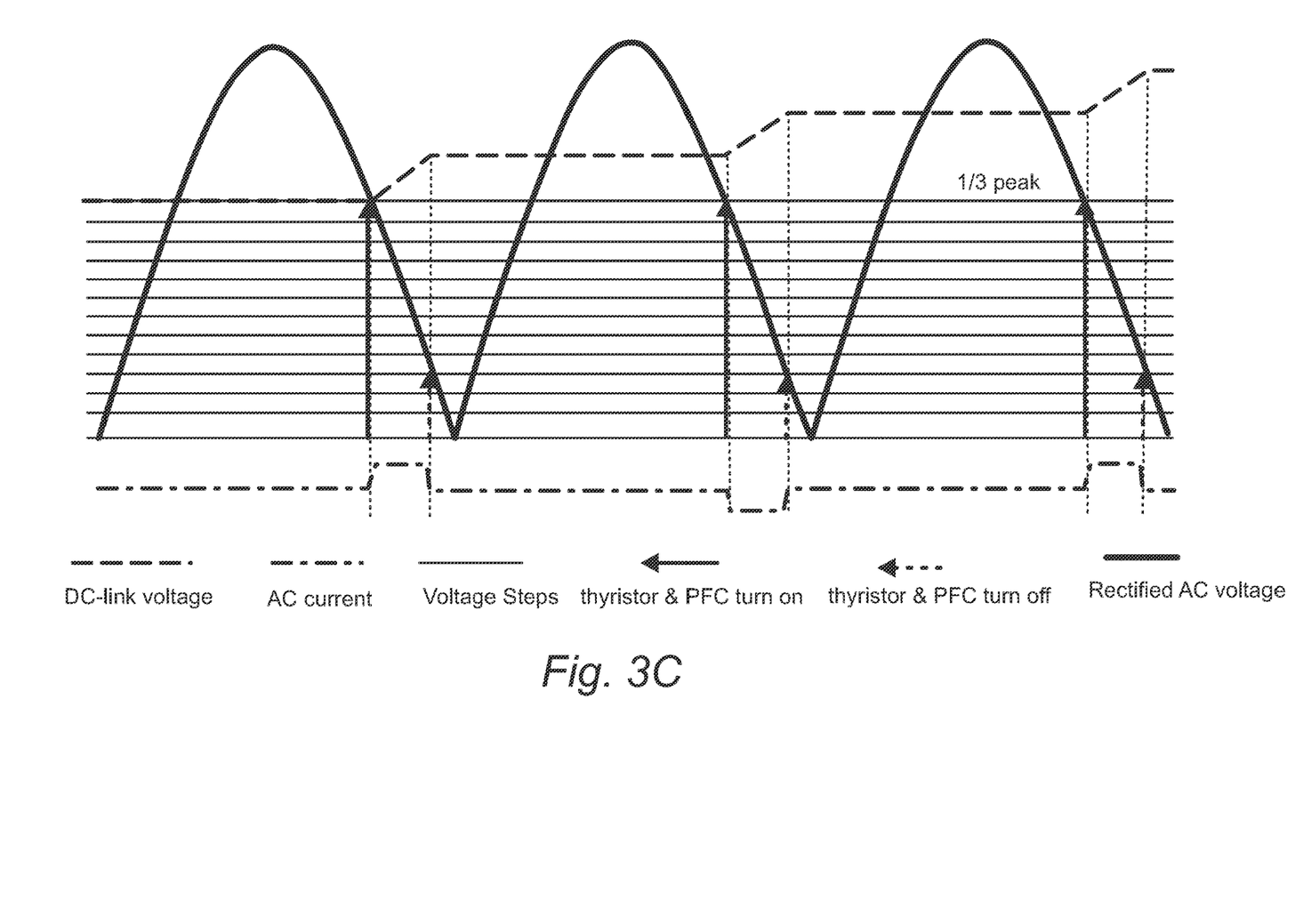
FIG. 3C. Plots of the voltages and AC current during operation depicted in FIGS. 3A and 3B.

Referring to FIGS. 3A and 3B, operation in the second mode is illustrated. FIG. 3A illustrates PFC boost operation in a positive AC half-cycle, while FIG. 3B illustrates PFC boost operation in a negative AC half-cycle. FIG. 3C shows the DC link voltage, the AC current flowing to DC-Link capacitor 24, the voltage steps (i.e., threshold voltages), the rectified AC voltage, and the thyristor triggers for this mode. In each half-cycle, switch S1 in PFC 20 is switched ON and OFF with a switching frequency. In the second mode, PFC 20 can be used as a boost converter to deliver current from the AC input into the DC link even when the instantaneous input voltage is below the DC link voltage. If the PFC 20 is used, there is no need to trigger the SCR up to the peak AC voltage, and it can remain at an intermediate value (e.g., 1/3 of the peak AC input voltage). In particular, when the rectified AC voltage is above the pre-defined voltage value, the PFC 20 operates to boost the capacitor voltage. PFC 20 acts as a boost converter in this phase, with the DC Link voltage rising in the next AC cycles until it reaches a voltage near or at the DC-Link desired voltage.

During the second mode, the PFC 20 is active. In a refinement, the switch $S_1$ in PFC 20 is alternatingly turned on and off with a predetermined frequency during the second mode. It should be appreciated that the SCR charging method keeps executing in the same way as the first mode, but with the voltage threshold not being incremented and with PFC 20 being activated, e.g., with a constant current setpoint. The reason to do this is that, if the trigger moment continued moving to higher voltages, it would become more uncertain because the input voltage signal is flatter. Therefore, the charging method would be more sensitive to noisy input voltage waveforms. At the value of 1/3 the voltage slope is still large enough to be immune to noise, and voltage is high enough to quickly charge the DC link with the PFC. It should be appreciated that whether or not the SCR voltage trigger is incremented, PFC 20 can be activated even from the very beginning of the pre-charge.

It should also be appreciated that the thyristors remain active to maintain the DC Link at that working voltage (which in some variations is about 400 V) after the pre-charge is complete (e.g., not in either mode 1 or mode 2) leaving the energy transfer equalization to the PFC. Normal operation of on-board charger 10 then proceeds.

The main logic of the charging method is to trigger a pulse in the SCR as soon as the voltages goes below the threshold.

Figure 4:
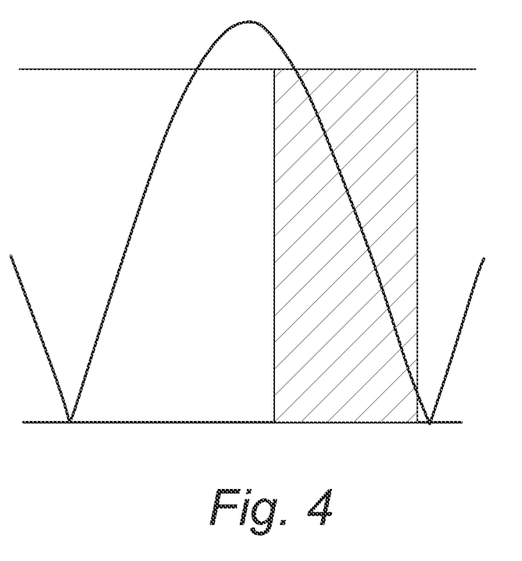
FIG. 4. Plot illustrating AC peak check.
Figure 5:
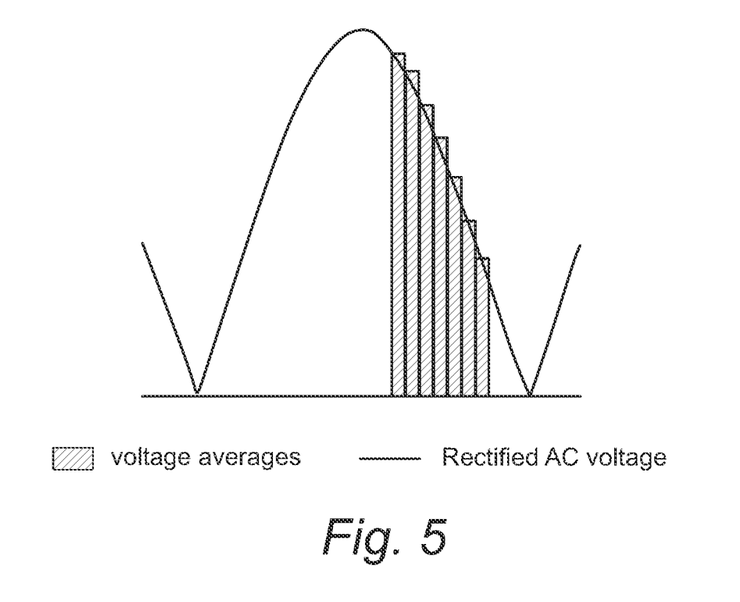
FIG. 5. Plot illustrating decreasing voltage detection.
Figure 6:
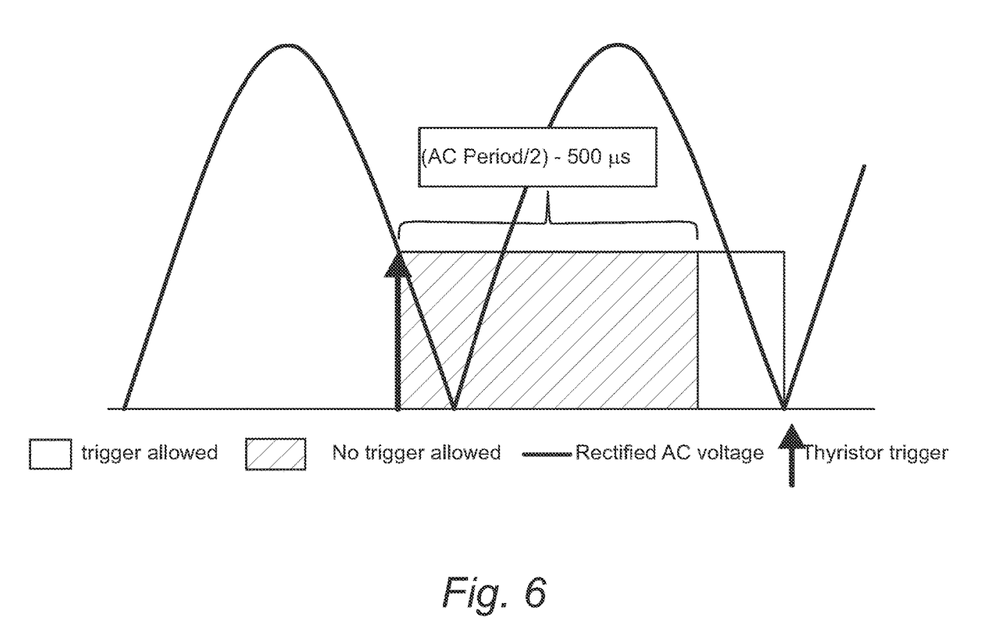
FIG. 6. Plot illustrating minimum trigger delta.

However, because of the AC signal being noisy, blindly following these steps could lead to wrong SCR trigger times and damage the components. In order to ensure that the SCR is never triggered except when it is time for it, it is better to implement some digital filtering rule prior to every single triggering. In addition to the rules set forth below, the measured frequency must be in an acceptable range for operation, depending on the grid. In a refinement, the charging method set forth herein only allows triggering SCR if the input voltage peak has already been reached. In one situation, as depicted in FIG. 4, the OBC 10 is only operated in the first mode when a measured AC input voltage is within a predetermined voltage difference from a previously measured peak AC input voltage. In a refinement, the predetermined voltage difference is about 20 V or more. Based on previous AC peak voltage measurements, the instantaneous measurement must have been at least the predetermined voltage difference close to the peak AC voltage. In the example of FIG. 4, the AC voltage needs to first cross the −20V line upwards and then downwards, entering the hatched region, where this constraint is fulfilled. This refinement provides a degree of noise immunity because noise can generate peaks with voltage going down. This voltage going down could be considered as the AC signal is in the decreasing quarter cycle. This could lead the microcontroller to trigger the thyristors, and a big amount of current could be transferred to the DC-Link capacitor, with the respective stress and EMI. In another situation, as depicted in FIG. 5, the OBC 10 is only operated in the first mode when a measured AC input voltage is less that than an average peak voltage for a predetermined number of voltage cycles. As depicted in FIG. 5, the voltage must be decreasing, an average is calculated in windows (e.g., of about 800 µs), to ensure that the SCR is triggered only when voltage is steadily decreasing in magnitude. Moreover, the average of the previous window must be higher than the one of the current window. In still another situation as depicted in FIG. 6, the OBC 10 is only operated in the first mode when the time period between consecutive trigger pulses is larger than half the time period for the AC input voltage minus a predetermined time difference. In a refinement, the predetermined time difference is about 500 µs or less.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An on-board charger comprises:
a silicon controlled rectifier circuit configured to receive an AC input voltage and output a rectified AC voltage;
a power factor correction circuit configured to receive the rectified AC voltage and output a DC voltage; and
a DC-link capacitor loaded with the DC voltage as a DC-link capacitor voltage; and
a controller configured to trigger the silicon controlled rectifier circuit in a first mode that occurs when the AC input voltage is at a position of a half-cycle of the AC input voltage having a slope pointing to 0 volts wherein when an instantaneous capacitor voltage is below a voltage threshold, the voltage threshold is incremented for a next half-cycle such that the DC-link capacitor voltage incrementally increases until eventually being loaded at a pre-defined DC-link working voltage or a voltage within a pre-defined amount of the pre-defined DC-Link working voltage.

2. The on-board charger of claim 1, wherein the first mode is implemented when the DC voltage is below or equal to a pre-defined voltage value.

3. The on-board charger of claim 2 wherein the DC-link capacitor is charged in voltage steps with the voltage threshold for triggering the silicon controlled rectifier circuit increased after each voltage step until the voltage threshold reaches the predetermined voltage value with charging continuing while the voltage threshold is below the pre-defined voltage value so that during charging periods the silicon controlled rectifier circuit is triggered with trigger pulses to enable energy flow such that the DC-Link capacitor charges as the voltage threshold increases after each voltage step.

4. The on-board charger of claim 3 wherein the controller is further operable to operate in a second mode in which the DC-link capacitor voltage is above the pre-defined voltage value, the power factor correction circuit operates to boost the DC-link capacitor voltage.

5. The on-board charger of claim 4 wherein in the second mode, the power factor correction circuit is active.

6. The on-board charger of claim 1 wherein the silicon controlled rectifier circuit comprises a full-wave rectifier including a first thyristor in a first rectifier arm and a second thyristor in a second rectifier arm.

7. The on-board charger of claim 6 wherein the silicon controlled rectifier circuit the full-wave rectifier further includes a first diode in the first rectifier arm and a second diode in the second rectifier arm.

8. The on-board charger of claim 1 wherein a measured AC input voltage is within a predetermined voltage difference from a previously measured peak AC input voltage.

9. The on-board charger of claim 8 wherein the predetermined voltage difference is at least 20 V.

10. The on-board charger of claim 1 wherein a measured AC input voltage is less that than an average peak voltage for a predetermined number of consecutive measurement samples.

11. The on-board charger of claim 1 wherein the time period between consecutive trigger pulses is less than half the time period for the AC input voltage by a predetermined time difference.

12. The on-board charger of claim 11 wherein the predetermined time difference is about 500 µs.

13. The on-board charger of claim 1 wherein charging is implemented every AC half-cycle during descending quarters of the rectified AC voltage.

14. An on-board charger for an electric vehicle, the on-board charger comprising:
a silicon controlled rectifier circuit configured to receive an AC input voltage and output a rectified AC voltage;
a power factor correction circuit configured to receive the rectified AC voltage and output a DC voltage;
a DC-Link capacitor loaded with the DC voltage as a DC-link capacitor voltage; and
a controller configured to operate in a first mode and a second mode depending on the DC voltage, wherein in the first mode while the DC voltage is below or equal to a pre-defined voltage value, the DC-link capacitor is charged in voltage steps with a voltage threshold for triggering the silicon controlled rectifier circuit increased after each voltage step until the voltage threshold reaches the predetermined voltage value wherein charging continues while the voltage threshold is below the pre-defined voltage value so that during charging periods the silicon controlled rectifier circuit is triggered with trigger pulses to enable energy flow such that the DC-Link capacitor charges as the voltage threshold increases after each voltage step and wherein in the second mode while the DC voltage is above the pre-defined voltage value, the power factor correction circuit operates to boost the DC-link capacitor voltage.

15. The on-board charger of claim 14 wherein the silicon controlled rectifier circuit comprises a full-wave rectifier including a first thyristor in a first rectifier arm and a second thyristor in a second rectifier arm and a first diode in the first rectifier arm and a second diode in the second rectifier arm.

16. The on-board charger of claim 14 wherein a measured AC input voltage is within a predetermined voltage difference from a previously measured peak AC input voltage.

17. The on-board charger of claim 14 wherein a measured AC input voltage is less that than an average peak voltage for a predetermined number of consecutive measurement samples.

18. The on-board charger of claim 15 wherein the time period between consecutive trigger pulses is less than half the time period for the AC input voltage by a predetermined time difference.

19. The on-board charger of claim 15 wherein charging is implemented every AC half-cycle during descending quarters of the rectified AC voltage.

20. The on-board charger of claim 15 wherein the pre-charge function in boost mode is stopped when the DC-link capacitor voltage greater than the AC peak voltage by a predetermined voltage amount.

21. An on-board charger comprises:
a silicon controlled rectifier circuit configured to receive an AC input voltage and output a rectified AC voltage;
a power factor correction circuit configured to receive the rectified AC voltage and output a DC voltage; and
a DC-link capacitor loaded with the DC voltage as a DC-link capacitor voltage; and
a controller configured to trigger the silicon controlled rectifier circuit in a first mode that occurs when the AC input voltage is at a position of a half-cycle of the AC input voltage having a slope pointing to 0 volts wherein when an instantaneous capacitor voltage is below a voltage threshold, the voltage threshold is incremented for a next half-cycle such that the DC-link capacitor voltage incrementally increases until eventually being loaded at a pre-defined DC-link working voltage or a voltage within a pre-defined amount of the pre-defined DC-Link working voltage; and
wherein the controller is further operable to operate in a second mode in which the DC-link capacitor voltage is above the pre-defined voltage value, the power factor correction circuit operates to boost the DC-link capacitor voltage.

* * * * *